United States Patent
Burriss et al.

(10) Patent No.: US 11,681,450 B2
(45) Date of Patent: Jun. 20, 2023

(54) SYSTEM AND METHOD FOR SELF-ENCRYPTING DRIVE REVERSION DURING RE-INITIALIZATION OF A STORAGE ARRAY

(71) Applicant: EMC IP Holding Company, LLC, Hopkinton, MA (US)

(72) Inventors: Michael Lee Burriss, Raleigh, NC (US); Colleen Marie Jacobson, Boylston, MA (US); Weixing Wang, Durham, NC (US); Mahadevan Vasudevan, Westborough, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 69 days.

(21) Appl. No.: 17/350,072

(22) Filed: Jun. 17, 2021

(65) Prior Publication Data
US 2022/0404991 A1    Dec. 22, 2022

(51) Int. Cl.
*G06F 3/06* (2006.01)
*H04L 9/08* (2006.01)

(52) U.S. Cl.
CPC .......... *G06F 3/0634* (2013.01); *G06F 3/0604* (2013.01); *G06F 3/0683* (2013.01); *H04L 9/0894* (2013.01)

(58) Field of Classification Search
CPC ....... H04L 9/0891–0897; H04L 9/0822; H04L 2463/062; G06F 3/06; H04W 12/047; H04W 12/0433; H04W 12/0431; H04W 12/043; H04W 12/041; H04W 12/04
See application file for complete search history.

(56) References Cited

U.S. PATENT DOCUMENTS

| 10,678,953 | B1 * | 6/2020 | Allo | H04L 9/0877 |
|---|---|---|---|---|
| 2009/0097719 | A1 * | 4/2009 | Lim | G06F 21/79 382/124 |
| 2017/0244698 | A1 * | 8/2017 | Gale | H04L 63/0853 |
| 2019/0303603 | A1 * | 10/2019 | Courtney | H04L 9/0637 |

* cited by examiner

*Primary Examiner* — Khoa D Doan
(74) *Attorney, Agent, or Firm* — Brian J. Colandreo; Heath M. Sargeant; Holland & Knight LLP

(57) ABSTRACT

A method, computer program product, and computing system for receiving a re-initialization operation request for a storage array, the storage array including a plurality of self-encrypting drives. A reversion state may be determined for each self-encrypting drive of the plurality of self-encrypting drives. In response to determining that at least one self-encrypting drive is in an unreverted state, at least one predefined reversion key for reverting the at least one self-encrypting drive from a predefined area of the storage array may be accessed. Each self-encrypting drive of the plurality of self-encrypting drives in the unreverted state may be reverted to a reverted state using the at least one predefined reversion key.

14 Claims, 9 Drawing Sheets

SYSTEM AND METHOD FOR SELF-ENCRYPTING DRIVE REVERSION DURING RE-INITIALIZATION OF A STORAGE ARRAY

BACKGROUND

Storing and safeguarding electronic content may be beneficial in modern business and elsewhere. Accordingly, various methodologies may be employed to protect and distribute such electronic content.

When reinitializing a storage array, a user expects the storage array (including the storage devices) to be brought into a factory default state with the software that is being installed and initialized. Users expect this regardless of the current state of the storage array when the initialization or re-initialization process or operation starts. When initializing a storage array with self-encrypting drives, the self-encrypting drives are brought into a manufacturing state with the drive's Manufacturer's Secure ID (MSID) as the key to unlock the self-encrypting drives for the storage system to lock them to the storage array using a unique secure ID (SID) during the initialization or re-initialization operation. To revert a self-encrypting drive back into its original manufacturing state, which also scrambles any existing data that was previously on the drive, revert commands are issued to the drives using the SID that was used to lock them. Failure to revert self-encrypting drives in this process results in the drives being locked out of the initializing storage array. This locked state is only recoverable using a drive's unique physical system ID (PSID) that is physically printed on the drive's label in the enclosure. This is extremely inefficient for cases with many self-encrypting drives within a storage array, and the user of the system may not be able to physically access the storage array.

SUMMARY OF DISCLOSURE

In one example implementation, a computer-implemented method executed on a computing device may include, but is not limited to, receiving a re-initialization operation request for a storage array, the storage array including a plurality of self-encrypting drives. A reversion state may be determined for each self-encrypting drive of the plurality of self-encrypting drives. In response to determining that at least one self-encrypting drive is in an unreverted state, at least one predefined reversion key for reverting the at least one self-encrypting drive from a predefined area of the storage array may be accessed. Each self-encrypting drive of the plurality of self-encrypting drives in the unreverted state may be reverted to a reverted state using the at least one predefined reversion key.

One or more of the following example features may be included. Determining a state of the storage array as one of: a normal state; a faulted state; and an unknown state. In response to determining that the storage array is in the normal state, reverting each self-encrypting drive in the unreverted state using a running operating system environment. In response to determining that the storage array is in the faulted state: the at least one predefined key may be accessed, prior to the re-initialization operation, within the predefined area using a secondary operating system environment and each self-encrypting drive in the unreverted state may be reverted using the secondary operating system environment. At least one predefined engineering reversion key may be defined during initialization of the storage array. The at least one predefined engineering reversion key may be stored in the predefined area of the storage array. It may be determined that the at least one predefined reversion key is inaccessible. The at least one predefined engineering reversion key may be determined for reverting the plurality of self-encrypting drives and each self-encrypting drive of the plurality of self-encrypting drives may be reverted to a reverted state using the at least one predefined engineering reversion key. The at least one predefined reversion key may be defined for reverting the plurality of self-encrypting drives during initialization of the storage array and the at least one predefined reversion key may be stored in the predefined area of the storage array.

In another example implementation, a computer program product resides on a computer readable medium that has a plurality of instructions stored on it. When executed by a processor, the instructions cause the processor to perform operations that may include, but are not limited to, receiving a re-initialization operation request for a storage array, the storage array including a plurality of self-encrypting drives. A reversion state may be determined for each self-encrypting drive of the plurality of self-encrypting drives. In response to determining that at least one self-encrypting drive is in an unreverted state, at least one predefined reversion key for reverting the at least one self-encrypting drive from a predefined area of the storage array may be accessed. Each self-encrypting drive of the plurality of self-encrypting drives in the unreverted state may be reverted to a reverted state using the at least one predefined reversion key.

One or more of the following example features may be included. Determining a state of the storage array as one of: a normal state; a faulted state; and an unknown state. In response to determining that the storage array is in the normal state, reverting each self-encrypting drive in the unreverted state using a running operating system environment. In response to determining that the storage array is in the faulted state: the at least one predefined key may be accessed, prior to the re-initialization operation, within the predefined area using a secondary operating system environment and each self-encrypting drive in the unreverted state may be reverted using the secondary operating system environment. At least one predefined engineering reversion key may be defined during initialization of the storage array. The at least one predefined engineering reversion key may be stored in the predefined area of the storage array. It may be determined that the at least one predefined reversion key is inaccessible. The at least one predefined engineering reversion key may be determined for reverting the plurality of self-encrypting drives and each self-encrypting drive of the plurality of self-encrypting drives may be reverted to a reverted state using the at least one predefined engineering reversion key. The at least one predefined reversion key may be defined for reverting the plurality of self-encrypting drives during initialization of the storage array and the at least one predefined reversion key may be stored in the predefined area of the storage array.

In another example implementation, a computing system includes at least one processor and at least one memory architecture coupled with the at least one processor, wherein the at least one processor is configured to receive a re-initialization operation request for a storage array, the storage array including a plurality of self-encrypting drives. The at least one processor may be further configured to determine a reversion state for each self-encrypting drive of the plurality of self-encrypting drives. The at least one processor may be further configured to, in response to determining that at least one self-encrypting drive is in an unreverted state, access at least one predefined reversion key for reverting the at least one self-encrypting drive from a predefined area of the storage array. The at least one processor may be further configured to revert each self-encrypting drive of the plurality of self-encrypting drives in the unreverted state to a reverted state using the at least one predefined reversion key.

One or more of the following example features may be included. Determining a state of the storage array as one of: a normal state; a faulted state; and an unknown state. In response to determining that the storage array is in the normal state, reverting each self-encrypting drive in the unreverted state using a running operating system environment. In response to determining that the storage array is in the faulted state: the at least one predefined key may be accessed, prior to the re-initialization operation, within the predefined area using a secondary operating system environment and each self-encrypting drive in the unreverted state may be reverted using the secondary operating system environment. At least one predefined engineering reversion key may be defined during initialization of the storage array. The at least one predefined engineering reversion key may be stored in the predefined area of the storage array. It may be determined that the at least one predefined reversion key is inaccessible. The at least one predefined engineering reversion key may be defined for reverting the plurality of self-encrypting drives and each self-encrypting drive of the plurality of self-encrypting drives may be reverted to a reverted state using the at least one predefined engineering reversion key. The at least one predefined reversion key may be defined for reverting the plurality of self-encrypting drives during initialization of the storage array and the at least one predefined reversion key may be stored in the predefined area of the storage array.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
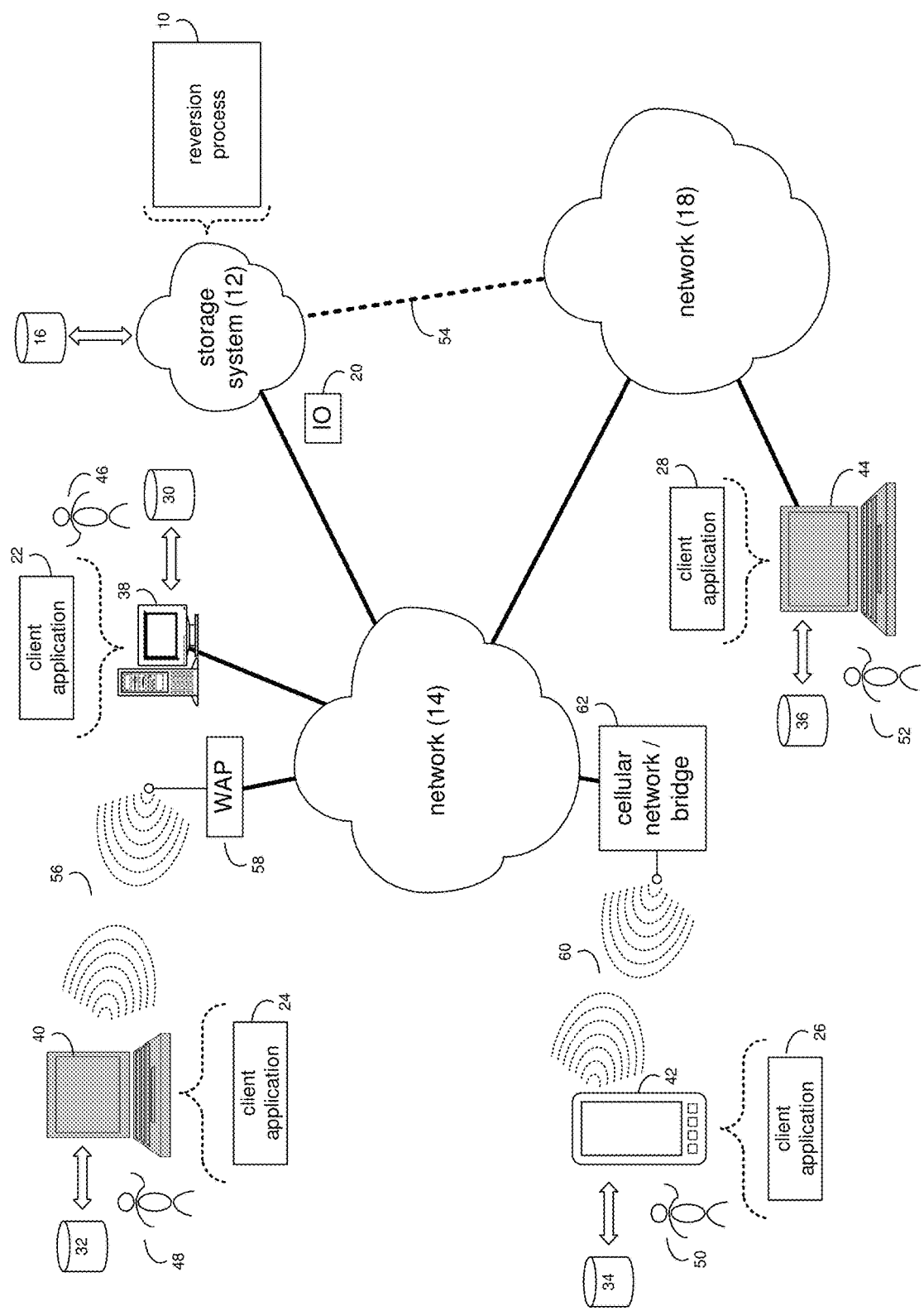
FIG. 1 is an example diagrammatic view of a storage system and a reversion process coupled to a distributed computing network according to one or more example implementations of the disclosure.

System Overview:

Referring to FIG. 1, there is shown reversion process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of reversion process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of reversion process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a reversion process, such as reversion process 10 of FIG. 1, may include but is not limited to, receiving a re-initialization operation request for a storage array, the storage array including a plurality of self-encrypting drives. A reversion state may be determined for each self-encrypting drive of the plurality of self-encrypting drives. In response to determining that at least one self-encrypting drive is in an unreverted state, at least one predefined reversion key for reverting the at least one self-encrypting drive from a predefined area of the storage array may be accessed. Each self-encrypting drive of the plurality of self-encrypting drives in the unreverted state may be reverted to a reverted state using the at least one predefined reversion key.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
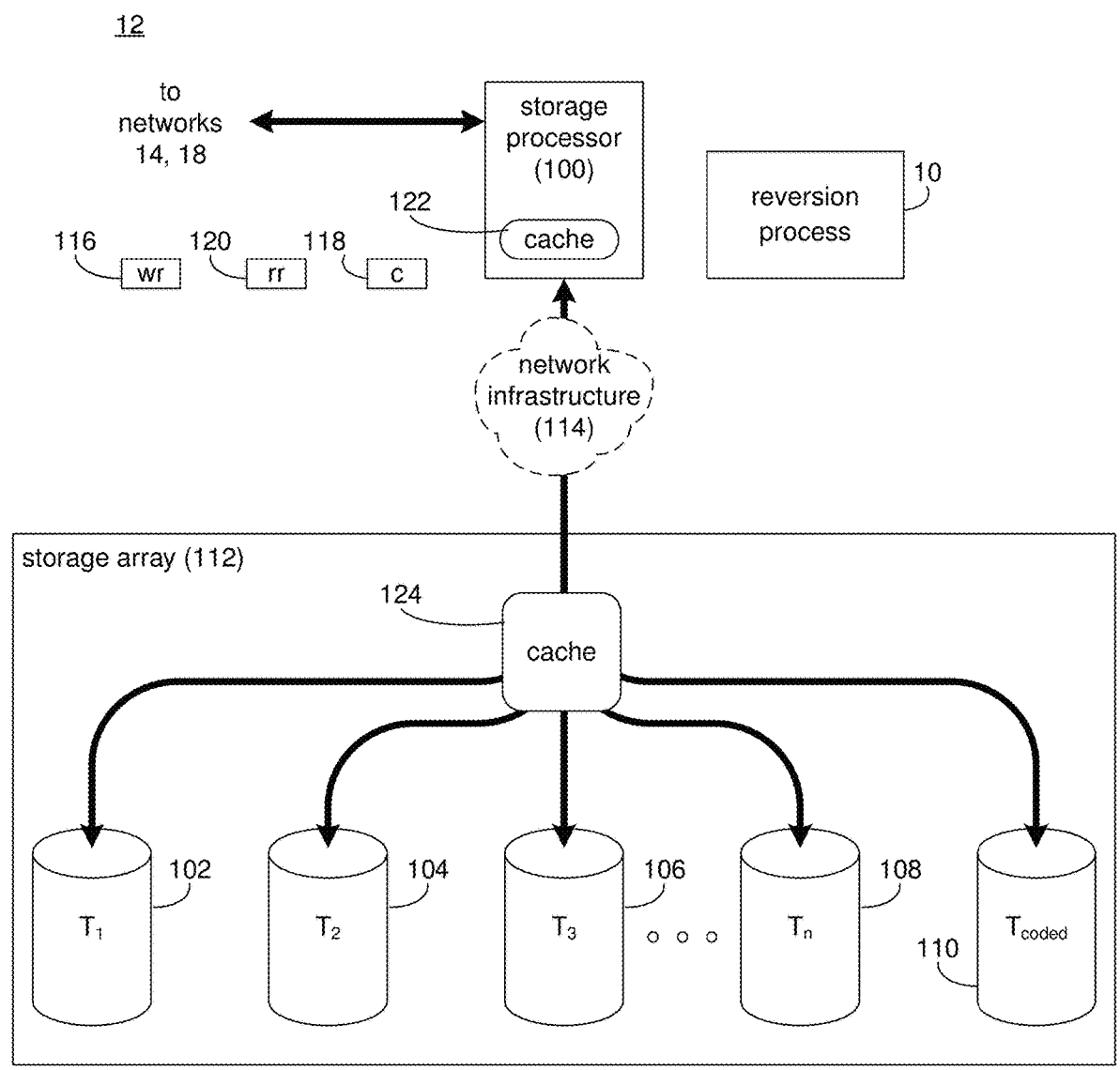
FIG. 2 is an example diagrammatic view of the storage system of FIG. 1 according to one or more example implementations of the disclosure.
Figure 3:
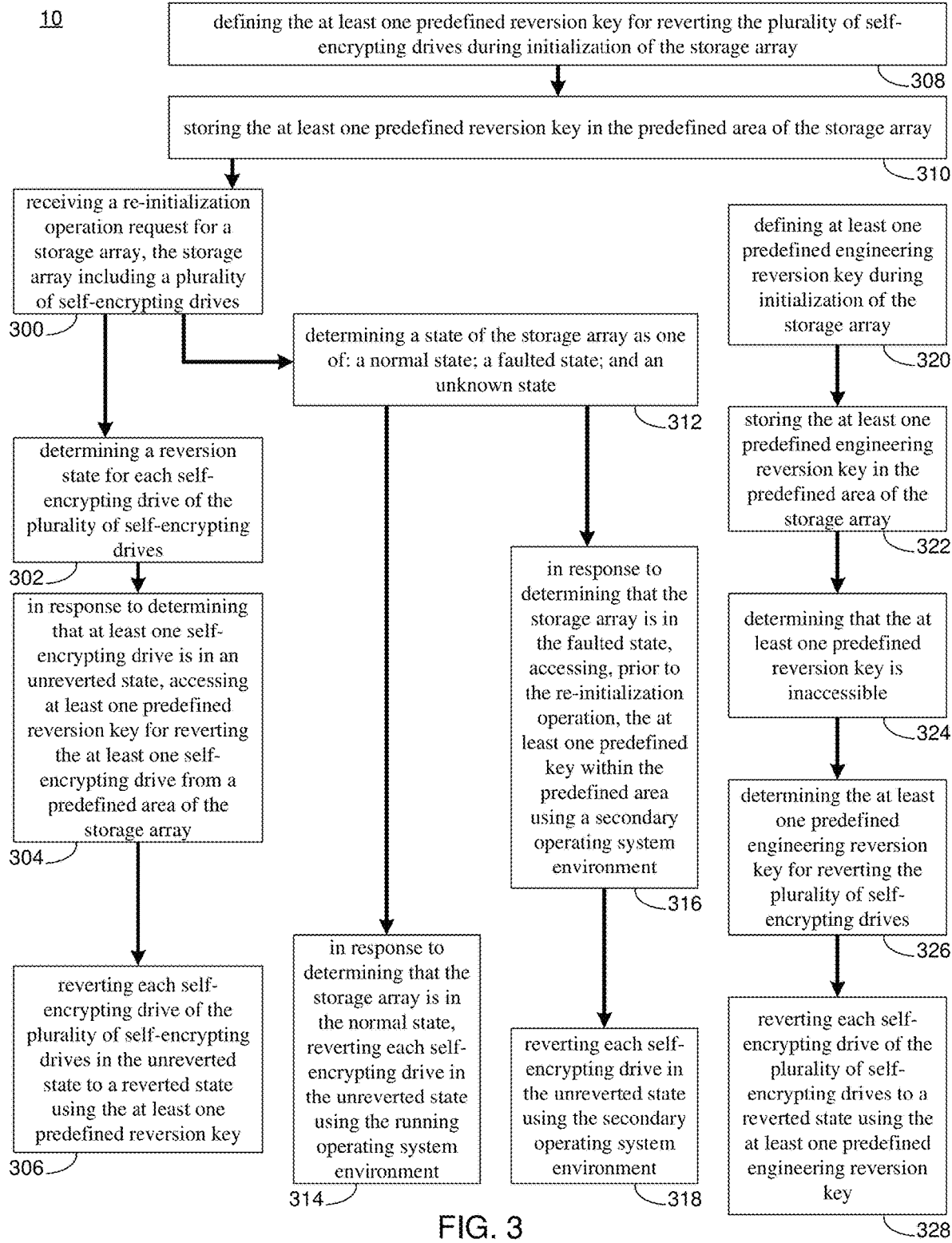
FIG. 3 is an example flowchart of reversion process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form storage array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of reversion process 10. The instruction sets and subroutines of reversion process 10, which may be stored on a storage device (e.g., storage device 16) coupled to storage processor 100, may be executed by one or more processors (not shown) and one or more memory architectures (not shown)

included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of reversion process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to storage array 112 (if frontend cache memory system 122 is configured as a write-through cache) or may subsequently write content 118 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of storage array 112, content 118 to be written to storage array 112 may be received from storage processor 100. Storage array 112 may initially store content 118 within backend cache memory system 124 prior to being stored on e.g. one or more of storage targets 102, 104, 106, 108, and coded target 110.

As discussed above, the instruction sets and subroutines of reversion process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of reversion process 10 may be executed by one or more processors (not shown) and one or more memory architectures (not shown) included within storage array 112.

Further and as discussed above, during the operation of storage array 112, content (e.g., content 118) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Reversion Process:

Referring also to the examples of FIGS. 3-9 and in some implementations, reversion process 10 may receive 300 a re-initialization operation request for a storage array, the storage array including a plurality of self-encrypting drives. A reversion state may be determined 302 for each self-encrypting drive of the plurality of self-encrypting drives. In response to determining that at least one self-encrypting drive is in an unreverted state, at least one predefined reversion key for reverting the at least one self-encrypting drive from a predefined area of the storage array may be accessed 304. Each self-encrypting drive of the plurality of self-encrypting drives in the unreverted state may be reverted 306 to a reverted state using the at least one predefined reversion key.

As will be discussed in greater detail below, implementations of the present disclosure may allow for re-initialization of a storage array with self-encrypting drives (SEDs) from any storage array state. For example, when reinitializing a storage array, the user expects the storage array (including the storage devices) to be brought into a factory default state with the software that is being installed and initialized. Users expect this regardless of the current state of the storage array when the initialization or re-initialization process or operation starts. When initializing a storage array with self-encrypting drives, the self-encrypting drives are brought into a manufacturing state with the drive's Manufacturer's Secure ID (MSID) as the key to unlock the self-encrypting drives for the storage system to lock them to the storage array using a unique secure ID (SID) during the initialization or re-initialization operation. To revert a self-encrypting drive back into its original manufacturing state, which also scrambles any existing data that was previously on the drive, revert commands are issued to the drives using the SID that was used to lock them. Failure to revert self-encrypting drives in this process results in the drives being locked out of the initializing storage array. This locked state is only recoverable using a drive's unique physical system ID (PSID) that is physically printed on the drive's label in the enclosure. This is extremely inefficient for cases with many self-encrypting drives within a storage array, and the user of the system may not be able to physically access the storage array.

As will be discussed in greater detail below, when a re-initialization operation is executed on a self-encrypting drive that has been previously locked by the current operating system that is still actively running, the currently running software may perform a reversion operation on the self-encrypting drive before allowing the re-initialization operation to proceed since the currently running operating system "knows" the active SID pin(s) for the self-encrypting drive. However, the storage array may be in various states where the current operating system is not running in a minimal state to be able to perform SED drive reversion operations and/or when a re-initialization operations occurs randomly with a Preboot eXecution Environment (PXE)

leading to the loss of the current operating system, along with the knowledge of the current SID pin(s). For example, this is quite frequent in a development environment where engineers introduce bugs into the system and need to reinitialize the storage array to recover. In another example, users of the storage array may also perform re-initialization operations, but more rarely and usually at the direction of engineers or storage array manufacturer personnel.

In the case of a storage array in a failed state or a PXE in a random state, it may not be possible to run the pre-initialization or "pre-re-initialization" reversion of the self-encrypting drives on the currently installed software. When this happens, the original SID pin(s) that locked the self-encrypting drives to the storage array are lost and the only way to factory-reset the self-encrypting drives to use them with the storage array, or any storage array, may be to manually revert them one-by-one using the PSID, which is printed on the physical label on the drive. In these situations, because the storage array is faulted, the user must get the storage array back to a minimal operating state to access the locked drives to unlock them with the PSID or re-initialize fully to a normal operating state but leaving the drives locked. Once the storage array is running the new operating system environment, the user must still match up all of PSIDs of the drives the storage array determines to be locked, manually revert them all using their PSIDs, and then attempt to revert the drives or reinitialize the storage array again so the drives are useable and can be initialized for use by the storage system. Accordingly, this could involve a wasted initialization operation to get a new operating system environment on the storage array to recover the drives only to then perform another re-initialization operation so the operating system environment detects the self-encrypting drives as unlocked.

As discussed above, a user must be able to perform these re-initialization operations in a secure manner as to not expose the PSIDs since they are the master SIDs for each drive to revert them. This problem is compounded when the user of the storage array is physically separated from the storage array.

Accordingly and as will be discussed in greater detail below, implementations of the present disclosure may ensure that a re-initialization of the storage array from any state using various initialization methods can revert any self-encrypting drives back to their manufacturing, factory-default, state in an automatic way during the re-initialization of the storage array itself. This may allow the user to seamlessly re-initialize the storage array repeatedly without worrying about separately recovering any previously locked drives; including having to request access to the PSID off a drive's label. Additionally, in a development or testing environment, the user may no longer worry about any previous state of the drives from the previous user of the storage array or any previous state of the operating system environment on the storage system. In this manner, implementations of the present disclosure may improve the functionality of a storage array and the ability to efficiently re-initialize the storage array with self-encrypting drives.

In some implementations, reversion process 10 may receive 300 a re-initialization operation request for a storage array, the storage array including a plurality of self-encrypting drives. For example, a re-initialization operation request may generally include a request received from a user of a storage system to re-initialize a storage array. As is known in the art, initializing or re-initializing a storage array may generally include restoring a storage array into a factory default state with an operating system environment and other software that is being installed and initialized. In some implementations, the storage array may include a plurality of self-encrypting drives. As discussed above and as is known in the art, a self-encrypting drive may generally include a hard disk drive (HDD) or solid state drive (SSD) with an encryption circuit built into the drive. The self-encrypting drive transparently encrypts all data written to the media and, when unlocked, transparently decrypts all data read from the media.

Figure 4:
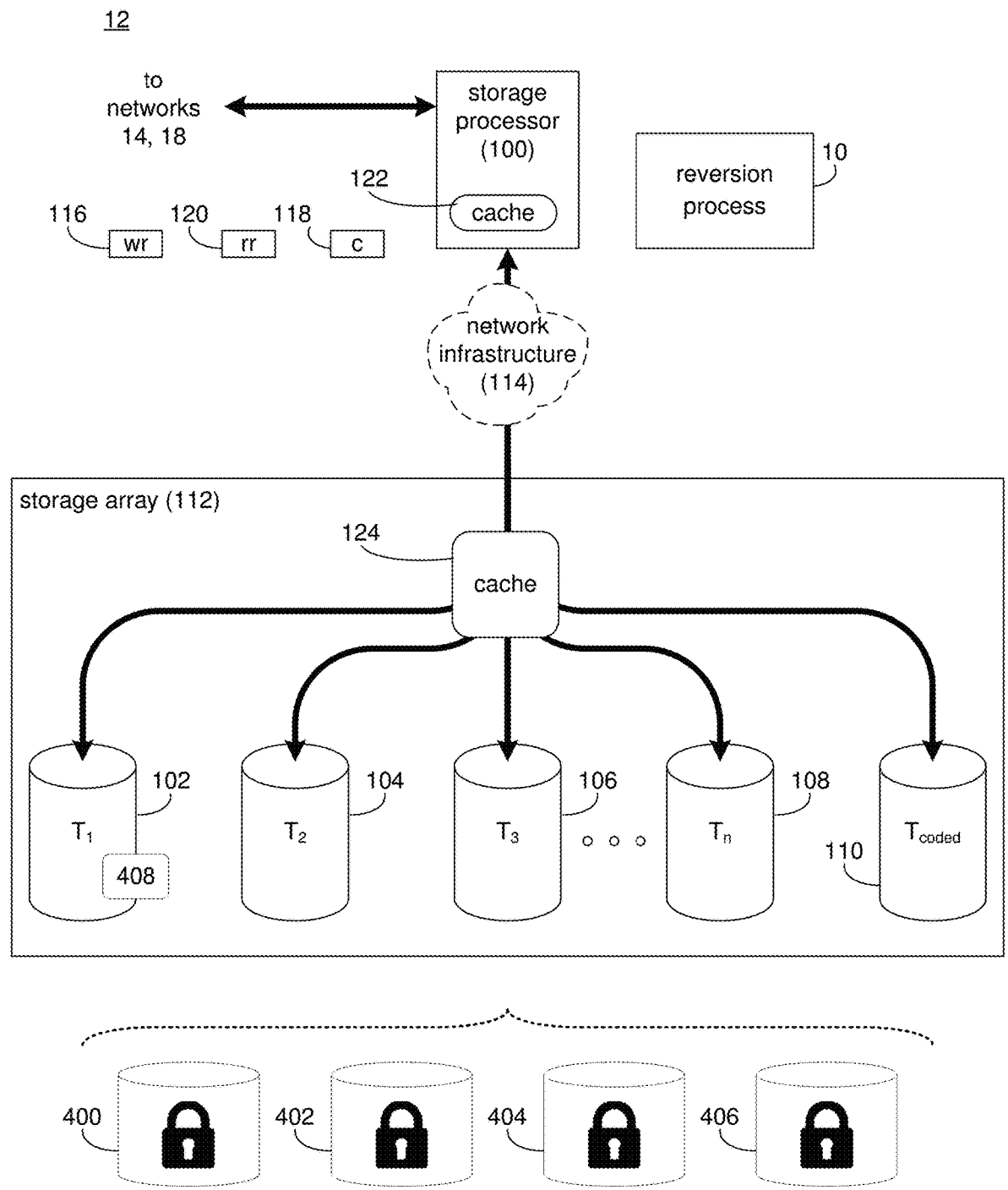
FIGS. 4-5 are example diagrammatic views of the storage system of FIG. 1 according to various example implementations of the disclosure.

Referring also to FIG. 4 and in some implementations, storage array 112 may include a plurality of self-encrypting drives (e.g., self-encrypting drives 400, 402, 404, 406) configured to store data. While the example of FIG. 4 includes e.g., four self-encrypting drives, it will be appreciated that this is for example purposes only and that storage array 112 may include any number of self-encrypting drives within the scope of the present disclosure. In some implementations, each self-encrypting drive (e.g., self-encrypting drives 400, 402, 404, 406) may be configured to be locked to storage array 112 with a unique secure ID (SID) (e.g., SID 408). Accordingly, with SID 408, self-encrypting drives 400, 402, 404, 406 may be accessible by storage array 112.

In some implementations, reversion process 10 may receive 300 a re-initialization operation request for a storage array. For example and referring also to FIG. 5, reversion process 10 may receive 300 a re-initialization operation request (e.g., re-initialization operation request 500) for re-initializing storage array 112 and the operating system environment and other software of storage array 112. As discussed above, re-initialization operation request 500 may include the reverting or reversion of self-encrypting drives 400, 402, 404, 406 to a factory-default state (e.g., a reverted state). However, depending on the state of the self-encrypting drives (e.g., a reversion state) and the state of the storage array (e.g., a normal state, a faulted state, an unknown state, etc.), self-encrypting drives 400, 402, 404, 406 may be inaccessible and/or unique SID (e.g., SID 408) for accessing and reverting self-encrypting drives 400, 402, 404, 406 may be lost. Accordingly and as will be discussed in greater detail below, reversion process 10 may provide a re-initialization copy of the unique SID for the self-encrypting drives in a predefined area only "known" and accessible by a subsequent initialization operation (e.g., a re-initialization operation).

In some implementations, reversion process 10 may determine 302 a reversion state for each self-encrypting drive of the plurality of self-encrypting drives. A reversion state may generally include an indication of whether the self-encrypted drive is in a factory-default configuration. For example and referring again to FIG. 5, reversion process 10 may determine 302 a reversion state for self-encrypting drives 400, 402, 404, 406 by determining whether any of self-encrypting drives 400, 402, 404, 406 are locked to storage array 112. If any of self-encrypting drives 400, 402, 404, 406 are locked to storage array 112, the locked self-encrypting drives 400, 402, 404, 406 may be in an unreverted state as they are locked due to a previous initialization (i.e., not in a factory-default configuration). In some implementations, reversion process 10 may determine 302 that self-encrypting drives 400, 402, 404, 406 are in a reverted state by determining that self-encrypting drives 400, 402, 404, 406 are capable of being locked to storage array 112 by defining a new unique SID for self-encrypting drives 400, 402, 404, 406. While two examples have been provided for determining 302 a reversion state for self-encrypting drives, it will be appreciated that these are for example purposes only and that other approaches may be used to determine 302 a reversion state for each self-encrypting drive within the scope of the present disclosure.

In some implementations and in response to determining that at least one self-encrypting drive is in an unreverted state, reversion process 10 may access 304 at least one predefined reversion key for reverting the at least one self-encrypting drive from a predefined area of the storage array. A predefined reversion key may generally include a unique SID defined for accessing the plurality of self-encrypting drives (e.g., self-encrypting drives 400, 402, 404, 406). For example and as discussed above, SID 408 may be defined by a conventional initialization process of storage array 112 to access self-encrypting drives 400, 402, 404, 406. In some implementations, SID 408 may be stored in storage array 112 such that an operating system environment running on storage array 112 can locate SID 408 and, using SID 408, access self-encrypting drives 400, 402, 404, 406. However, and as discussed above, if the current operating system environment is not running or the storage array is in a faulted state, SID 408 may be inaccessible and/or lost. As will be discussed in greater detail below, by defining and storing predefined reversion keys during initialization of the storage array in a predefined area of the storage array "known" by subsequent initialization operations, self-encrypting drives in an unreverted state may be accessible for reversion during the re-initialization operation regardless of the state of the storage array.

In some implementations, reversion process 10 may define 308 the at least one predefined reversion key for reverting the plurality of self-encrypting drives during initialization of the storage array. For example, during initialization of storage array 112, reversion process 10 may define a unique SID/predefined reversion key(s) for self-encrypting drives 400, 402, 404, 406. In some implementations, reversion process 10 may automatically generate the predefined reversion key(s). As will be discussed in greater detail below and in one example, reversion process 10 may define an engineering reversion key that may be known to a user or engineer testing the storage array and/or may be determined algorithmically such that the plurality of self-encrypting drives in an unreverted state may be reverted even if the original operating system environment is unavailable or lost and/or if the unique SID defined for the plurality of self-encrypting drives is unavailable or lost.

Figure 5:
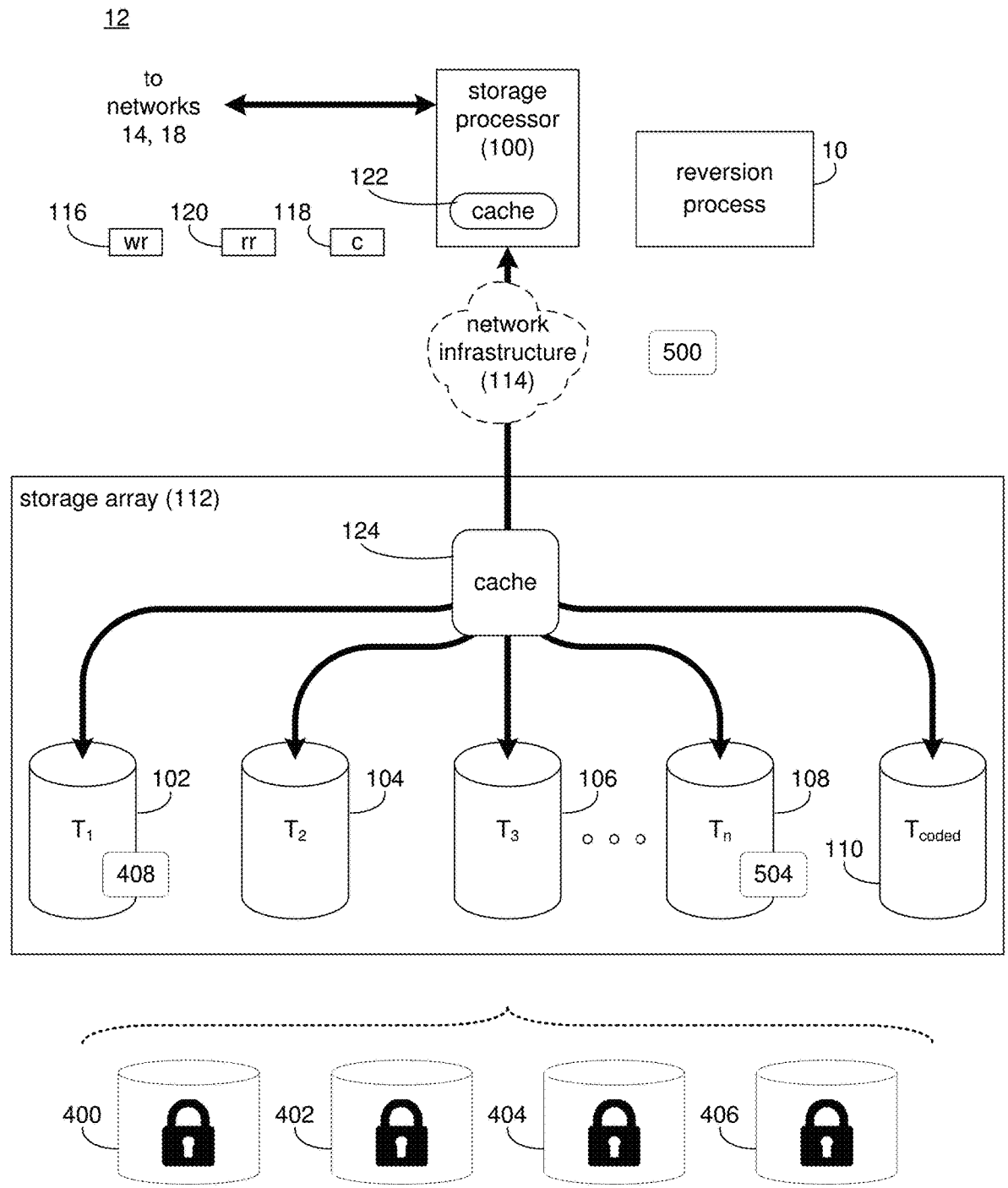

In some implementations, defining 308 the at least one predefined reversion key for reverting the plurality of self-encrypting drives may include generating a copy of the unique SID defined for the plurality of self-encrypting drives and/or defining a separate predefined reversion key. In one example and as shown in FIG. 5, reversion process 10 may define 308 the at least one predefined reversion key (e.g., predefined reversion key 504) as a copy of SID 408. In another example, reversion process 10 may define 308 predefined reversion key 504 as a separate key for accessing self-encrypting drives 400, 402, 404, 406.

In some implementations, reversion process 10 may store 310 the at least one predefined reversion key in the predefined area of the storage array. In some implementations, reversion process 10 may access a predefined area of storage array 112 "known" to initialization operations such that each initialization operation or re-initialization operation. The predefined area of storage array 112 may be separate from the portion of storage array 112 configured to store SID 408. In this manner, at least one predefined reversion key 504 may be securely accessible only by initialization operations or re-initialization operations. As will be discussed in greater detail below, by storing 310 at least one predefined reversion key 504 in the predefined area of storage array 112 only known by and/or accessible by initialization operations or re-initialization operations, reversion process 10 may allow self-encrypting drives 400, 402, 404, 406 to be reverted regardless of the state of storage array 112 and the operating system environment of storage array 112.

In some implementations, reversion process 10 may revert 306 each self-encrypting drive of the plurality of self-encrypting drives in the unreverted state to a reverted state using the at least one predefined reversion key. Reverting a self-encrypting drive may generally include returning the self-encrypting drive to its original manufacturing state by scrambling any existing data that was previously on the drive. As discussed above and in some implementations, reversion process 10 may allow for the reversion of self-encrypting drives for various states of a storage array. For example, depending on the state of the storage array, an operating system environment may or may not be available or operational to access the unique SID for the plurality of self-encrypting drives at the time of a re-initialization operation request. Accordingly, reversion process 10 may revert 306 each self-encrypting drive of the plurality of self-encrypting drives in the unreverted state to a reverted state using the at least one predefined reversion key based upon, at least in part, the state of the storage array.

In some implementations, reversion process 10 may determine 312 a state of the storage array as one of: a normal state; a faulted state; and an unknown state. For example and as discussed above, a request to perform a re-initialization operation may be received 300 for a storage array while the storage array is in various states. For instance, reversion process 10 may determine 312 the state of the storage array in response to receiving 300 the re-initialization operation request in order to determine how to revert 306 the unreverted self-encrypting drives. In some implementations, a normal state may generally include a state where the operating system environment is functioning or running such that the SID for the self-encrypting drives is accessible. A faulted state may generally include a state where the operating system environment is not functioning or running such that the SID for the self-encrypting drives is inaccessible via the current operating system environment. An unknown state may generally include a state where the status of the operating system environment is unknown. For example, when a Preboot eXecution Environment (PXE) occurs, the state of the storage array is unknown. While an example of PXE resulting in an unknown state has been described, it will be appreciated that other conditions may result in determining an unknown state of the storage array. While three example states for the storage array have been described, it will be appreciated that this is for example purposes only and that reversion process 10 may determine any number or type of state(s) within the scope of the present disclosure.

Figure 6:
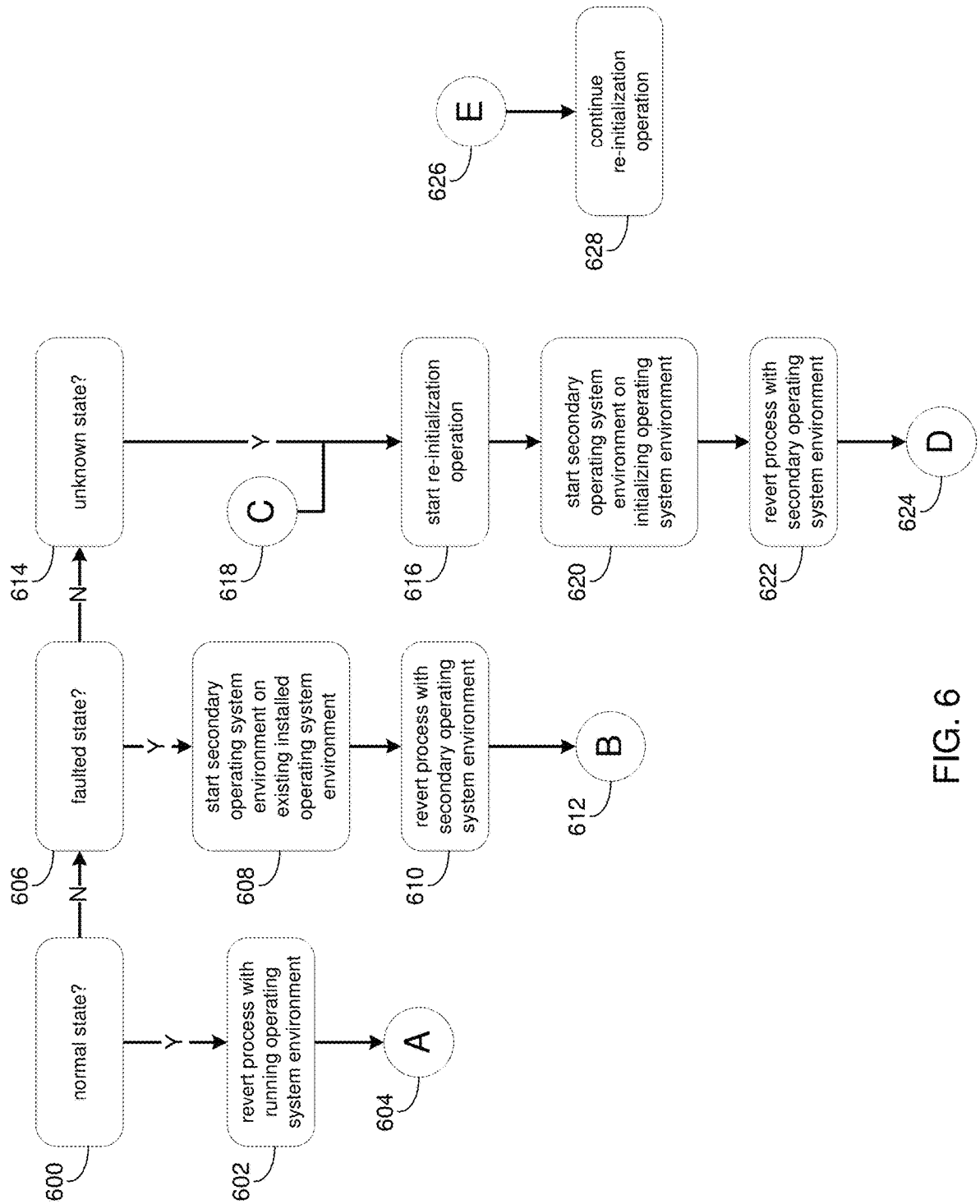
FIGS. 6-9 are example flowcharts of reversion process according to various example implementations of the disclosure.
Figure 7:
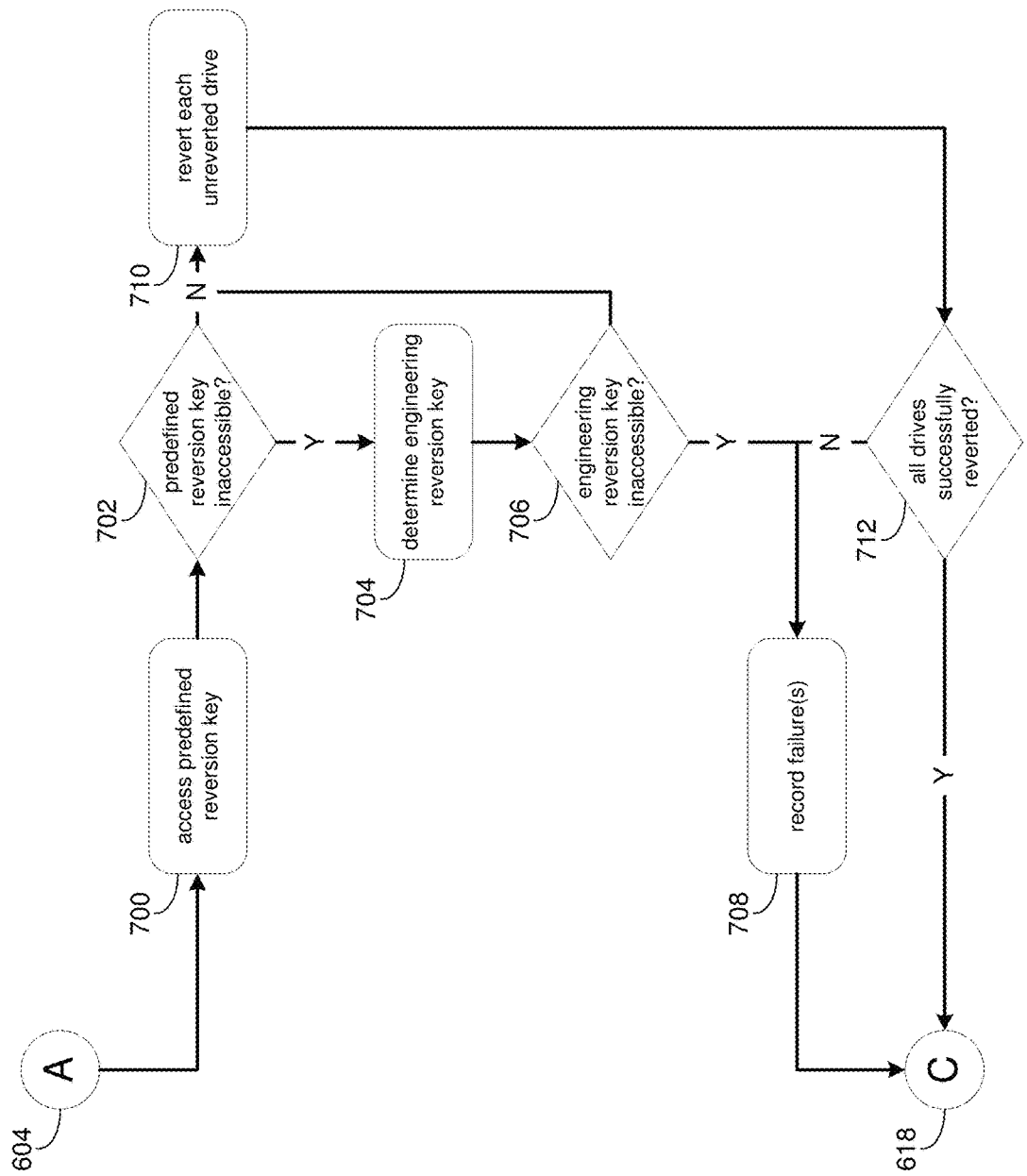

In some implementations and in response to determining that the storage array is in the normal state, reversion process 10 may revert 306 each self-encrypting drive in the unreverted state using the running operating system environment. Referring also to FIGS. 6-7 and in some implementations, reversion process 10 may determine 312 that storage array 112 is in the normal state (e.g., shown as action 600 in FIG. 6). In some implementations, reversion process 10 may revert 314 each self-encrypting drive in the unreverted state using the running operating system environment (e.g., shown as action 602 in FIG. 6). For example, reverting 314 each self-encrypting drive in the unreverted state may include the actions as shown in FIG. 7 (e.g., shown as action 604 in FIGS. 6 and 7).

As shown in FIG. 7, reversion process 10 may access 304 the at least one predefined reversion key using the running operating system environment (e.g., shown as action 700 in FIG. 7). If the at least one predefined reversion key is inaccessible (e.g., shown as action 702 in FIG. 7), reversion process 10 may determine an engineering reversion key (e.g., shown as action 704 in FIG. 7). As will be discussed in greater detail below, an engineering reversion key may generally include a default key or a randomly generated key predefined for accessing the self-encrypting drives. If the engineering reversion key is inaccessible (e.g., shown as action 706 in FIG. 7), reversion process 10 may record the failure (e.g., shown as action 708) and return to the process of FIG. 6 (e.g., shown as action 618 in FIGS. 6 and 7). If the at least one predefined reversion key is accessible, reversion process 10 may revert 314 each self-encrypting drive in the unreverted state using the running operating system environment (e.g., shown as action 710 in FIG. 7). If the engineering reversion key is accessible, reversion process 10 may revert each self-encrypting drive in the unreverted state using the running operating system environment and the engineering reversion key. If all self-encrypting drives are determined to be reverted (e.g., shown as action 712), reversion process 10 may return to the process of FIG. 6 (e.g., shown as action 618 in FIGS. 6 and 7). Otherwise, reversion process 10 may record the failure associated with unsuccessfully reverting any of the self-encrypting drives (e.g., shown as action 708) and return to the process of FIG. 6. Accordingly, when the storage array is in a normal state (i.e., when the operating system environment is up and running normally and an image re-initialization is being performed), the operating system environment that is running performs the revert of the self-encrypting drives. In some implementations, reversion process 10 may also set any new, future reversion key generation preferences when the drives are re-locked, in-band as part of the logic that pre-stages and sets up the storage system to be reinitialized.

Figure 8:
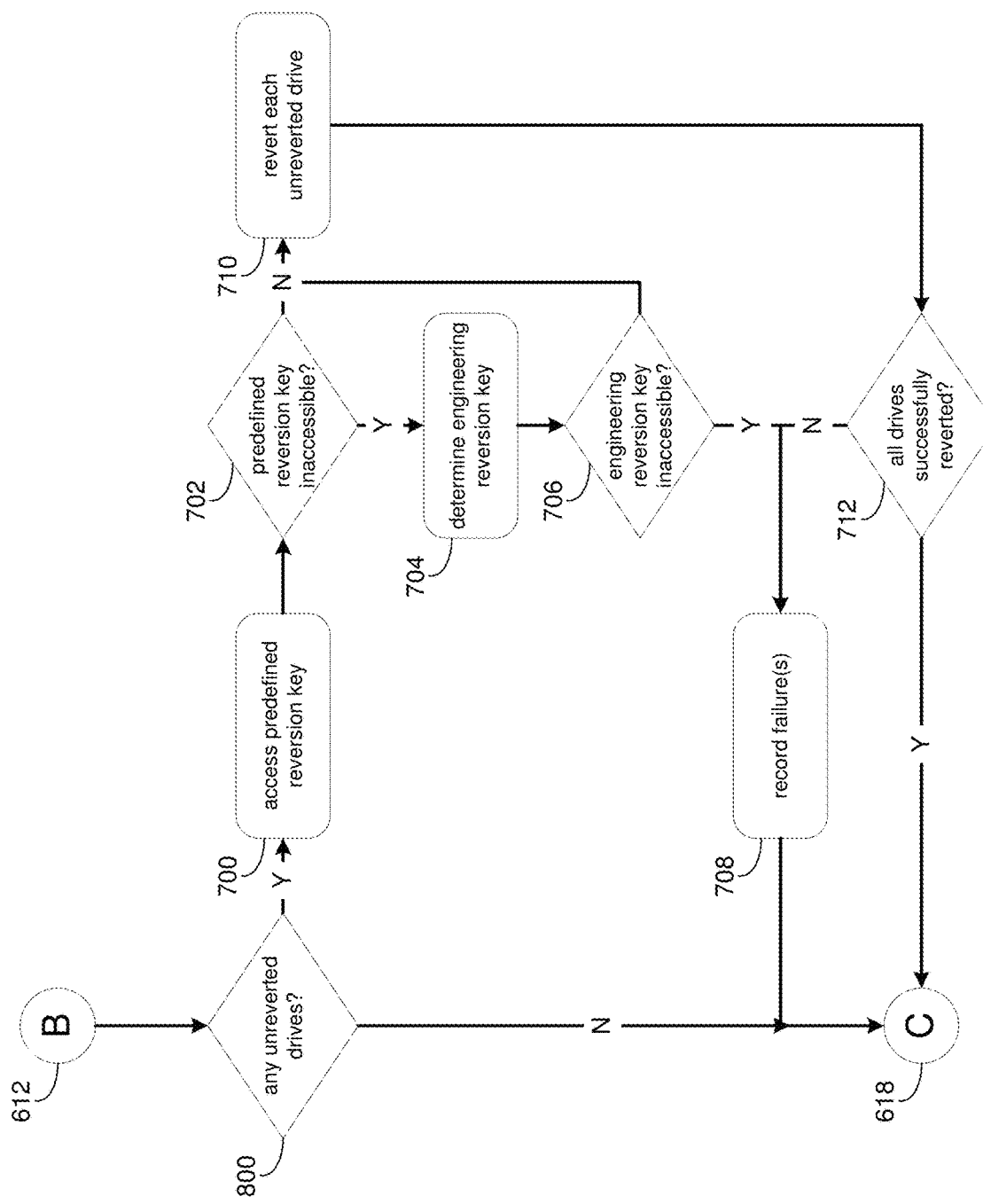

In some implementations and in response to determining that the storage array is in the faulted state, reversion process 10 may access 316, prior to the re-initialization operation, the at least one predefined key within the predefined area using a secondary operating system environment; and revert 318 each self-encrypting drive in the unreverted state using the secondary operating system environment. Referring also to FIGS. 6 and 8 and in some implementations, reversion process 10 may determine 312 that storage array 112 is in the faulted state (e.g., shown as action 606 in FIG. 6). In some implementations, reversion process 10 may start a secondary operating system environment on the existing installed operating system environment of the storage system (e.g., shown as action 608 in FIG. 6). With the secondary operating system environment operational, reversion process 10 may revert 318 each self-encrypting drive in the unreverted state using the secondary operating system environment (e.g., shown as action 610 in FIG. 6). For example, reverting 318 each self-encrypting drive in the unreverted state may include the actions as shown in FIG. 8 (e.g., shown as action 612 in FIGS. 6 and 8).

As shown in FIG. 8, reversion process 10 may determine whether there are any unreverted drives (i.e., self-encrypting drives in an unreverted state) (e.g., shown as action 800 in FIG. 8). If reversion process 10 determines that there are unreverted self-encrypting drives in the storage array, reversion process 10 may access 316 the at least one predefined reversion key using the secondary operating system environment (e.g., shown as action 700 in FIG. 8). If the at least one predefined reversion key is inaccessible (e.g., shown as action 702 in FIG. 8), reversion process 10 may determine an engineering reversion key (e.g., shown as action 704 in FIG. 8). If the engineering reversion key is inaccessible (e.g., shown as action 706 in FIG. 8), reversion process 10 may record the failure (e.g., shown as action 708) and return to the process of FIG. 6 (e.g., shown as action 618 in FIGS. 6 and 8). If the at least one predefined reversion key is accessible, reversion process 10 may revert 318 each self-encrypting drive in the unreverted state using the secondary operating system environment (e.g., shown as action 710 in FIG. 8). If the engineering reversion key is accessible, reversion process 10 may revert each self-encrypting drive in the unreverted state using the secondary operating system environment and the engineering reversion key (e.g., shown as action 710 in FIG. 8). If all self-encrypting drives are determined to be reverted (e.g., shown as action 712), reversion process 10 may return to the process of FIG. 6 (e.g., shown as action 618 in FIGS. 6 and 8). Otherwise, reversion process 10 may record the failure associated with unsuccessfully reverting any of the self-encrypting drives (e.g., shown as action 708) and return to the process of FIG. 6. Accordingly, if the storage array is not in a normal state, reversion process 10 may assume that the storage array is in a faulted state and the re-initialization itself may use the operating system environment image's drivers that are being installed to attempt to securely retrieve the at least one predefined reversion key later in the re-initialization process and then automate the recovery and reversion of the self-encrypting drives before any attempt to access the self-encrypting drives for use by the new software/operating system environment initialized on the storage array.

Figure 9:
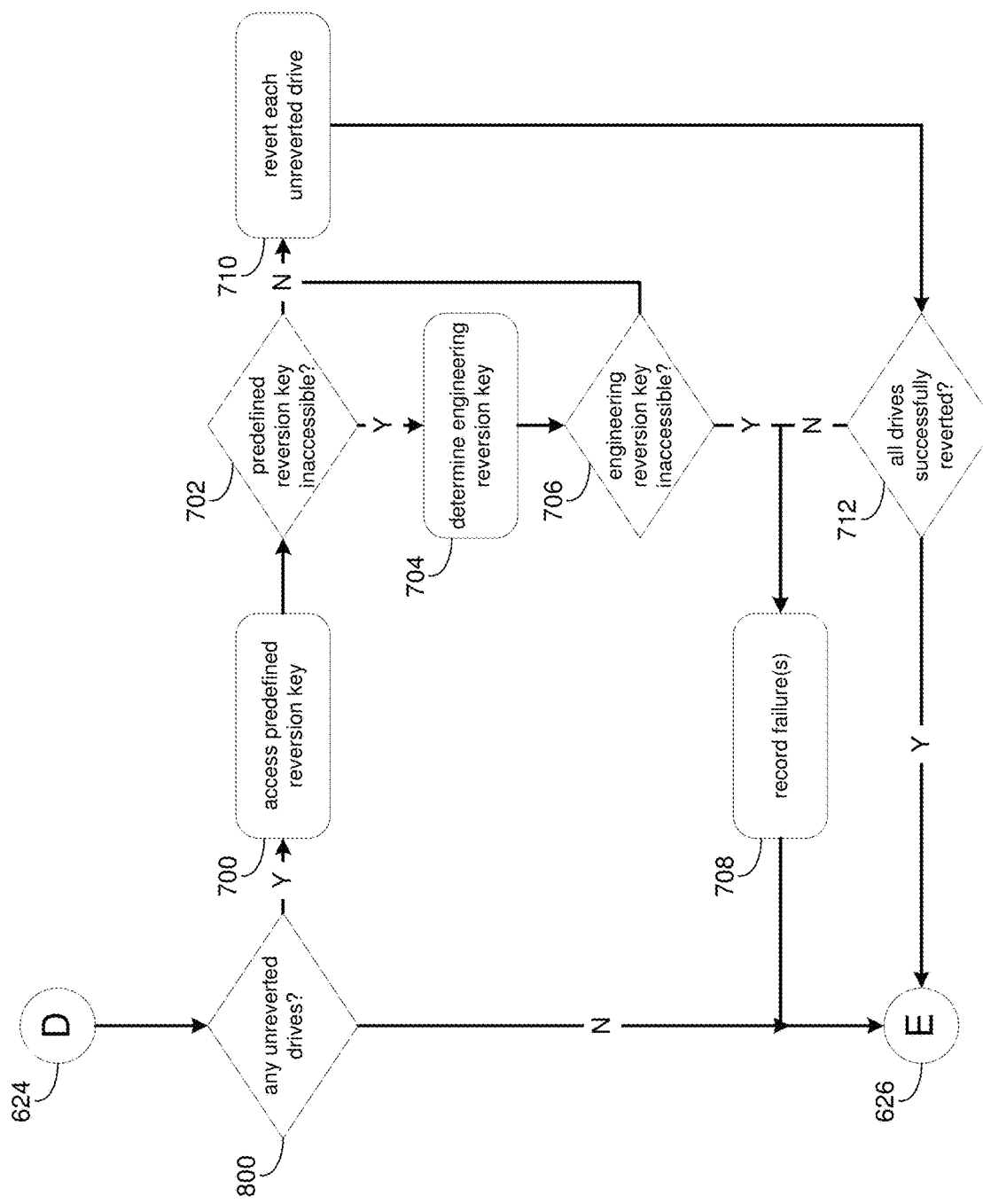

In some implementations and in response to determining that the storage array is in the unknown state, reversion process 10 may access, during the re-initialization operation, the at least one predefined key within the predefined area using the secondary operating system environment; and revert 306 each self-encrypting drive in the unreverted state using the secondary operating system environment. Referring also to FIGS. 6 and 9 and in some implementations, reversion process 10 may determine 312 that storage array 112 is in an unknown state (e.g., shown as action 614 in FIG. 6). In some implementations, reversion process 10 may start the re-initialization operation of the re-initialization operation request (e.g., shown as action 616 in FIG. 6). In some implementations, if the storage array is determined to be in either the normal or faulted state, reversion process 10 may continue from each respective process described above at action 618 shown in FIG. 6. In this manner, when the storage array is in the normal or faulted state, reversion process 10 may attempt to revert the self-encrypting drives using the installed operating system environment prior to the re-initialization operation.

In some implementations, reversion process 10 may start a secondary operating system environment on the initializing operating system environment of the storage system (e.g., shown as action 620 in FIG. 6). With the secondary operating system environment operational, reversion process 10 may revert 306 each self-encrypting drive in the unreverted state using the secondary operating system environment (e.g., shown as action 622 in FIG. 6). For example, reverting 306 each self-encrypting drive in the unreverted state may include the actions as shown in FIG. 9 (e.g., shown as action 624 in FIGS. 6 and 9).

As shown in FIG. 9, reversion process 10 may determine whether there are any unreverted drives (i.e., self-encrypting drives in an unreverted state) (e.g., shown as action 800 in FIG. 9). If reversion process 10 determines that there are unreverted self-encrypting drives in the storage array, reversion process 10 may access 304 the at least one predefined reversion key using the secondary operating system environment on the initializing operating system environment (e.g., shown as action 700 in FIG. 9). If the at least one predefined reversion key is inaccessible (e.g., shown as action 702 in FIG. 9), reversion process 10 may determine an engineering reversion key (e.g., shown as action 704 in FIG. 9). If the engineering reversion key is inaccessible (e.g., shown as action 706 in FIG. 9), reversion process 10 may record the failure (e.g., shown as action 708) and return to the process of FIG. 6 (e.g., shown as action 626 in FIGS. 6 and 9). If the at least one predefined reversion key is accessible, reversion process 10 may revert 306 each self-encrypting drive in the unreverted state using the secondary operating system environment on the initializing operating system environment (e.g., shown as action 710 in FIG. 9). If the engineering reversion key is accessible, reversion process 10 may revert each self-encrypting drive in the unreverted state using the secondary operating system environment and the engineering reversion key (e.g., shown as action 710 in FIG. 9). If all self-encrypting drives are determined to be reverted (e.g., shown as action 712 in FIG. 9), reversion process 10 may return to the process of FIG. 6 (e.g., shown as action 626 in FIGS. 6 and 9) and continue the re-initialization operation (e.g., shown as action 628 in FIG. 6). Otherwise, reversion process 10 may record the failure associated with unsuccessfully reverting all of the self-encrypting drives (e.g., shown as action 708), return to the process of FIG. 6 (e.g., shown as action 626 in FIGS. 6 and 9), and continue the re-initialization operation (e.g., shown as action 628 in FIG. 6). Accordingly, if an event causes the state of the storage array to be unknown (e.g., when a PXE occurs), no previous state may be assumed, and reversion process 10 may detect that the drives are locked using a similar minimum operating state as described above and may recover and revert the drives before any attempt is made by the storage array to access the drives.

In some implementations, reversion process 10 may define 320 at least one predefined engineering reversion key during initialization of the storage array. For example, an engineering reversion key may include a default key or a randomly generated key predefined for accessing the self-encrypting drives. In some implementations, the engineering reversion key may be predefined as a known value or may be solved by reversion process 10 in the event that the predefined engineering reversion key is lost. For example, suppose that during re-initialization of storage array 112, the predefined engineering reversion key is lost or erased. In this example, because the predefined engineering reversion key may have been predefined to be a machine-solvable key, reversion process 10 may solve for or otherwise determine the predefined engineering reversion key for accessing and reverting self-encrypting drive 400, 402, 404, 406.

In some implementations, defining 320 the at least one predefined engineering reversion key during initialization of the storage array may include receiving (e.g., via a user interface) a selection of at least one user-defined predefined engineering reversion key, at least one default predefined engineering reversion key, or a selection of an automatically defined predefined engineering reversion key. In some implementations, reversion process 10 may store 322 the at least one predefined engineering reversion key in the predefined area of the storage array. As discussed above, reversion process 10 may store 322 the predefined area of the storage array "known" to or accessible by initialization or re-initialization operations. In this manner, the predefined engineering reversion key may be an optionally-defined feature for storage arrays in engineering environments (e.g., not used to secure user data) that may allow for less complex reversions of self-encrypting drives during re-initialization of the storage array.

As shown in FIGS. 7-9, reversion process 10 may determine 324 that the at least one predefined reversion key is inaccessible (e.g., shown as action 702 in FIG. 7). If the at least one predefined reversion key is inaccessible (e.g., shown as action 702 in FIG. 7), reversion process 10 may determine 326 at least one predefined engineering reversion key (e.g., shown as action 704 in FIG. 7). If the at least one predefined engineering reversion key is accessible, reversion process 10 may revert 328 each self-encrypting drive in the unreverted state using the at least one predefined engineering reversion key (e.g., shown as action 710 in FIG. 7). Accordingly, a developer may use an engineering reversion key (e.g., a default pin or a randomly generated pin) by giving a preference during initialization without needing to have knowledge of how to hard code a default pin in the source code of the storage array, to aid in the development and testing of self-encrypting drives. This may also allow for better automated testing of certain fault testing of failed reverts and the like because a user of the storage array may utilize the predefined engineering reversion key.

As shown in FIGS. 6-9 and in some implementations, reversion process 10 may revert any unreverted self-encrypting drives of a storage array prior to and/or during a re-initialization operation being performed on the storage array regardless of the state of the storage array. In this manner, reversion process 10 may provide a secure approach for reverting self-encrypting drives of a storage system by storing the predefined reversion key(s) in a predefined area of the storage array only known by or accessible to re-initialization operations.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving a re-initialization operation request for a storage array, the storage array including a plurality of self-encrypting drives;
   determining a reversion state for each self-encrypting drive of the plurality of self-encrypting drives;
   in response to determining that at least one self-encrypting drive is in an unreverted state, accessing at least one predefined reversion key for reverting the at least one self-encrypting drive from a predefined area of the storage array;

reverting each self-encrypting drive of the plurality of self-encrypting drives in the unreverted state to a reverted state using the at least one predefined reversion key; and determining a state of the storage array as one of: a normal state; a faulted state; and an unknown state, wherein in response to determining that the storage array is in the normal state:

reverting each self-encrypting drive in the unreverted state using a running operating system environment.

2. The computer-implemented method of claim 1, in response to determining that the storage array is in the faulted state:

accessing, prior to the re-initialization operation, the at least one predefined key within the predefined area using a secondary operating system environment; and reverting each self-encrypting drive in the unreverted state using the secondary operating system environment.

3. The computer-implemented method of claim 1, further comprising:

defining at least one predefined engineering reversion key during initialization of the storage array; and storing the at least one predefined engineering reversion key in the predefined area of the storage array.

4. The computer-implemented method of claim 3, further comprising:

determining that the at least one predefined reversion key is inaccessible;

determining the at least one predefined engineering reversion key for reverting the plurality of self-encrypting drives; and reverting each self-encrypting drive of the plurality of self-encrypting drives to a reverted state using the at least one predefined engineering reversion key.

5. The computer-implemented method of claim 1, further comprising:

defining the at least one predefined reversion key for reverting the plurality of self-encrypting drives during initialization of the storage array; and storing the at least one predefined reversion key in the predefined area of the storage array.

6. A computer program product residing on a non-transitory computer readable medium having a plurality of instructions stored thereon which, when executed by a processor, cause the processor to perform operations comprising:

receiving a re-initialization operation request for a storage array, the storage array including a plurality of self-encrypting drives;

determining a reversion state for each self-encrypting drive of the plurality of self-encrypting drives;

in response to determining that at least one self-encrypting drive is in an unreverted state, accessing at least one predefined reversion key for reverting the at least one self-encrypting drive from a predefined area of the storage array;

reverting each self-encrypting drive of the plurality of self-encrypting drives in the unreverted state to a reverted state using the at least one predefined reversion key; and determining a state of the storage array as one of: a normal state; a faulted state; and an unknown state, wherein in response to determining that the storage array is in the normal state:

reverting each self-encrypting drive in the unreverted state using a running operating system environment.

7. The computer program product of claim 6, wherein the operations further comprise:

in response to determining that the storage array is in the faulted state:

accessing, prior to the re-initialization operation, the at least one predefined key within the predefined area using a secondary operating system environment; and reverting each self-encrypting drive in the unreverted state using the secondary operating system environment.

8. The computer program product of claim 6, wherein the operations further comprise:

defining at least one predefined engineering reversion key during initialization of the storage array; and storing the at least one predefined engineering reversion key in the predefined area of the storage array.

9. The computer program product of claim 8, wherein the operations further comprise:

determining that the at least one predefined reversion key is inaccessible;

determining the at least one predefined engineering reversion key for reverting the plurality of self-encrypting drives; and reverting each self-encrypting drive of the plurality of self-encrypting drives to a reverted state using the at least one predefined engineering reversion key.

10. The computer program product of claim 6, wherein the operations further comprise:

defining the at least one predefined reversion key for reverting the plurality of self-encrypting drives during initialization of the storage array; and storing the at least one predefined reversion key in the predefined area of the storage array.

11. A computing system comprising:

a memory; and a processor configured to receive a re-initialization operation request for a storage array, the storage array including a plurality of self-encrypting drives, wherein the processor is further configured to determine a reversion state for each self-encrypting drive of the plurality of self-encrypting drives, wherein the processor is further configured to, in response to determining that at least one self-encrypting drive is in an unreverted state, access at least one predefined reversion key for reverting the at least one self-encrypting drive from a predefined area of the storage array, wherein the processor is further configured to revert each self-encrypting drive of the plurality of self-encrypting drives in the unreverted state to a reverted state using the at least one predefined reversion key, wherein the processor is further configured to determine a state of the storage array as one of: a normal state; a faulted state; and an unknown state, and wherein the processor is further configured to: in response to determining that the storage array is in the normal state:

revert each self-encrypting drive in the unreverted state using a running operating system environment.

12. The computing system of claim 11, wherein the processor is further configured to:

in response to determining that the storage array is in the faulted state:

access, during the re-initialization operation, the at least one predefined key within the predefined area using a secondary operating system environment; and revert each self-encrypting drive in the unreverted state using the secondary operating system environment.

13. The computing system of claim 11, wherein the processor is further configured to:
- define at least one predefined engineering reversion key during initialization of the storage array; and
- store the at least one predefined engineering reversion key in the predefined area of the storage array.

14. The computing system of claim 13, wherein the processor is further configured to:
- determine that the at least one predefined reversion key is inaccessible;
- determine the at least one predefined engineering reversion key for reverting the plurality of self-encrypting drives; and
- revert each self-encrypting drive of the plurality of self-encrypting drives to a reverted state using the at least one predefined engineering reversion key.

* * * * *